(12) United States Patent
Tian

(10) Patent No.: US 11,814,192 B2
(45) Date of Patent: Nov. 14, 2023

(54) AIRCRAFT TRANSPORT TRAILER

(71) Applicant: Autoflight (Kunshan) Co., Ltd., Kunshan (CN)

(72) Inventor: Yu Tian, Hong Kong SAR (CN)

(73) Assignee: AUTOFLIGHT (KUNSHAN) CO., LTD., Jiangsu Province (CN)

( * ) Notice: Subject to any disclaimer, the term of this patent is extended or adjusted under 35 U.S.C. 154(b) by 0 days.

(21) Appl. No.: 18/194,649

(22) Filed: Apr. 2, 2023

(65) Prior Publication Data
US 2023/0312135 A1    Oct. 5, 2023

(30) Foreign Application Priority Data

Apr. 2, 2022   (CN) .......................... 202220762064.5

(51) Int. Cl.
*B64F 1/22* (2006.01)
*B60D 1/48* (2006.01)
*B62D 63/08* (2006.01)

(52) U.S. Cl.
CPC .................. *B64F 1/22* (2013.01); *B60D 1/48* (2013.01); *B62D 63/08* (2013.01)

(58) Field of Classification Search
CPC . B64F 1/22; B64F 1/002; B64F 1/225; B60D 1/48; B62D 63/08
See application file for complete search history.

(56) References Cited

U.S. PATENT DOCUMENTS

| | | | | |
|---|---|---|---|---|
| 2,980,270 A * | 4/1961 | Elliott | ....................... | B64F 1/22 414/537 |
| 3,119,502 A * | 1/1964 | Paul | ......................... | B60P 3/11 414/427 |
| 5,562,388 A * | 10/1996 | Le Gall | ..................... | B64F 1/22 414/427 |
| 7,976,029 B2 * | 7/2011 | Plummer | ............. | B60G 17/017 280/6.151 |
| 8,152,100 B2 * | 4/2012 | Nicholas | ................... | B60P 3/11 414/471 |

* cited by examiner

*Primary Examiner* — Kevin Hurley
*Assistant Examiner* — Michael R Stabley
(74) *Attorney, Agent, or Firm* — WPAT LAW, P.C.; Anthony King

(57) ABSTRACT

An aircraft transport trailer having a frame, a wheel assembly, a lower bracket, and an upper bracket. The wheel assembly is rotationally installed on the frame to support and move the frame. The lower bracket is fixedly installed on the frame, and the top of the lower bracket is provided with a body slot. The preset first surface of the inner wall of the body slot is fitted with the part of the lower surface of the body, the aircraft body can be partially seated in the aircraft body slot under the action of gravity.

20 Claims, 3 Drawing Sheets

AIRCRAFT TRANSPORT TRAILER

FIELD OF THE DISCLOSURE

The present disclosure relates to the technical field of aircraft, in particular to an aircraft transport trailer.

BACKGROUND OF THE INVENTION

When the aircraft is being transported over short distances, it cannot glide on the ground by its own wheel system. An aircraft transport trailer is typically used to transport the aircraft over short distances.

The prior art discloses an aircraft transport trailer, which is equipped with a limit bracket and a fixture assembly on the base frame with moving wheels. Before transporting the aircraft, the body of the aircraft is firstly disassembled into multiple body segments, and one of the disassembled body segments is placed on the limit bracket, then the fixture assembly is used to clamp and fix the body segment, then the base frame is dragged to transport one body segment, and the next body segment is transported after one body segment is transported.

The aircraft transport trailer in the prior art can not realize the fixation and transportation of the whole body, but it can only disassemble the body into multiple body segments and then fix and transport the body segments. This method not only requires a lot of manpower and time, but also increases the number of disassembly and assembly of the aircraft in the field, so that the quality and safety of the aircraft cannot be guaranteed. In addition, the aircraft transport trailer in the prior art can only transport the body, but not the wing. The transportation of the wing also needs to be realized with other transportation trailers, which greatly increases the time and logistics costs of aircraft transport. Therefore, it is urgent to propose an aircraft transport trailer to solve the above technical problems.

SUMMARY OF THE INVENTION

The present invention provides an aircraft transport trailer, which achieves the effect of transporting the whole body as well as transporting the body and the wings together.

To achieve this purpose, the invention uses the following technical solutions:

An aircraft transport trailer, comprises:
a frame;
a wheel assembly, the wheel assembly is rotatably mounted on the frame;
a lower bracket, the lower bracket is fixedly mounted on the frame, the lower bracket is provided with a body slot on top, the inner wall of the body slot comprises a preset first surface, the preset first surface is fitted to a part of the lower surface of the body of the aircraft to be transported, so that the body can be partially seated in the body slot;
an upper bracket, the upper bracket is provided on the lower bracket, the upper bracket is provided with a wing slot on top, the inner wall of the wing slot comprises a preset second surface, the preset second surface is seated with a partially lower surface of the wing (20) of the aircraft to be transported, so that the wing (20) can be partially seated in the wing slot.

Optionally, the upper bracket is snap-fit connected to the lower bracket, the upper bracket is further provided with an avoidance slot for avoiding the body which is snap-fitted into the body slot.

Optionally, the inner wall of the avoidance slot is close to the upper surface of the body which is clamped in the body slot.

Optionally, the lower bracket comprises a first lower bracket and a second lower bracket, the upper bracket comprises a first upper bracket and a second upper bracket, the first lower bracket is spaced with the second lower bracket, the first upper bracket is buckled and connected with the first lower bracket, the second upper bracket is buckled and connected with the second lower bracket, the body slot includes a first body slot and a second body slot, the first body slot is arranged on the first lower bracket, the second body slot is arranged on the second lower bracket, the avoidance slot includes a first avoidance slot and a second avoidance slot, the first avoidance slot is arranged on the first upper bracket, and the second avoidance slot is arranged on the second upper bracket.

Optionally, the number of the first body slot (311), the second body slot (321), the first avoidance slot (411) and the second avoidance slot (421) are all two, and the two first body slots (311) are distributed on both sides of the first lower bracket (310), and the two second body slots (321) are distributed on both sides of the second lower bracket (320).

Optionally, the first body slot on the same side is provided coaxially with the second body slot.

Optionally, the body slot further includes a third body slot, and the avoidance slot also includes a third avoidance slot, the third body slot is arranged in the middle of the first lower bracket and/or the middle of the second lower bracket, the third avoidance slot is opposite to the third body slot.

Optionally, the wing slot comprises a first wing slot and a second wing slot, the first wing slot is provided on the first upper bracket and the second wing slot is provided on the second upper bracket.

Optionally, it further comprises a strap, the lower bracket is provided with a lower fixing hole, the upper bracket is provided with an upper fixing hole, the strap passes through the lower fixing hole and the upper fixing hole for binding the lower bracket, the upper bracket, the body, and the wing.

Optionally, it further includes a connecting part, which is arranged on the frame (100) for connecting to the trailer hook of a vehicle.

Benefit:

The invention provides an aircraft transport trailer, including a frame, a wheel assembly, a lower bracket and an upper bracket, the wheel assembly is rotatably mounted on the frame for supporting and moving the frame, the lower bracket is fixedly mounted on the frame, and a body slot is provided on the top of the lower bracket, the inner wall of the body slot comprises a preset first surface, the preset first surface fits a part of the lower surface of the body of the aircraft to be transported, so that the body can be partially seated in the body slot under the action of gravity, thus realizing the effect of fixing the whole body on the lower bracket, and the body can be fixed and transported without disassembling the body when transporting the aircraft. At the same time, the upper bracket is provided on the lower bracket, and the wing slot is provided on the top of the upper bracket, and the wing slot includes a preset second surface, which fits to part of the lower surface of the wing of the aircraft to be transported, so that the wing can be partially seated in the wing slot under the action of gravity, thus realizing the fixation of the wing, and the wing and the body can be fixed together on the aircraft transport trailer, realizing the effect of transporting the body and the wing together. Compared with the existing technology, the body does not need to be disassembled and the procedure of transporting the body and the wing separately is eliminated, which provides guarantee for the quality and safety of the aircraft and also effectively reduces the time and logistical costs of transporting the aircraft.

Figure 1:
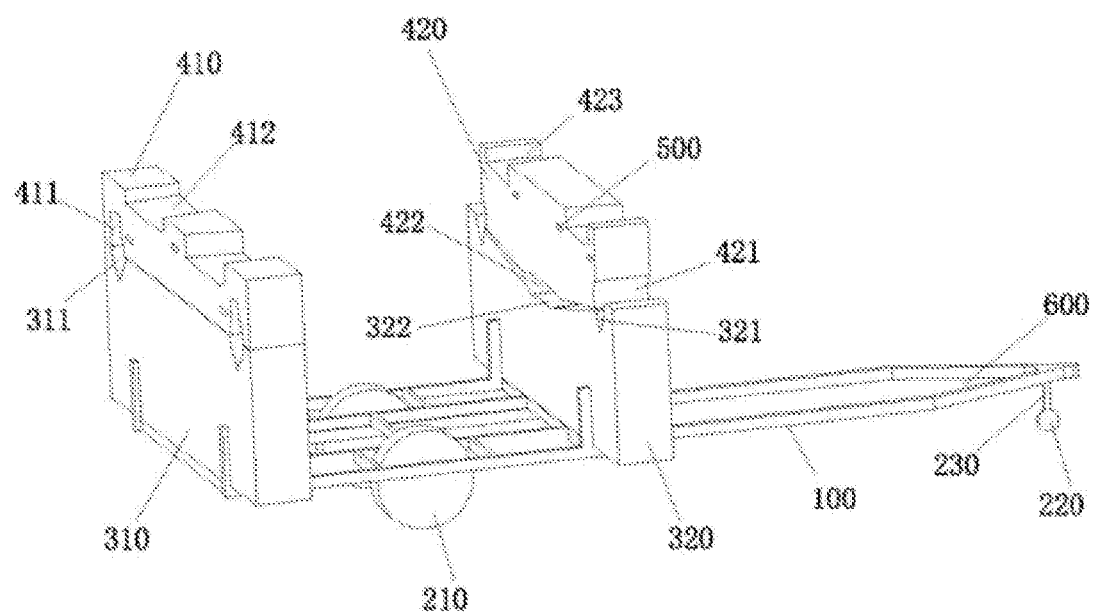
FIG. 1 is a schematic diagram of the structure of the vehicle transport trailer provided by the utility model.

The following call-out list of elements in the drawing can be a useful guide when referencing the elements of the drawing figures:
  10 Body
  20 Wing
  100 Frame
  210 Main wheel
  220 Auxiliary wheel
  230 Rod
  310 First lower bracket
  311 First body slot
  320 Second lower bracket
  321 Second body slot
  322 Third body slot
  410 First upper bracket
  411 First avoidance slot
  412 First wing slot
  420 Second upper bracket
  421 Second avoidance slot
  422 Third avoidance slot
  423 Second wing slot
  500 Upper fixing hole
  600 Connecting part

DETAILED DESCRIPTION

The present invention is further described in detail with the attached drawings and embodiments. It can be understood that the specific embodiments described here can be used to explain the invention, and can or cannot limit it. In addition, it should be noted that for the convenience of description, the attached drawings may only show part of the structure related to the invention, and may not the whole structure.

In the description of the invention, the terms "linked", "connected" and "fixed" should be understood in a broad sense unless otherwise specified and limited, for example, they can be fixed connections, detachable connections, or integrated; it can be mechanical connection or electrical connection; it can be directly connected, or indirectly connected through intermediate media, or it can be the internal connection of two components or the interaction between two components. For those skilled in the art, the specific meaning of the above terms in the invention can be understood in a specific case.

In this invention, unless otherwise expressly specified and limited, the first feature is "above" or "below" the second feature may include direct contact between the first and second features, or may include contact between the first and second features not directly, but through a separate feature between them. Also, the first feature is "on", "above" and "over" the second feature includes the first feature is directly above and diagonally above the second feature, or simply indicating that the first feature is horizontally higher above the second feature. The first feature is "under", "below" and "beneath" the second feature includes the first feature is directly below and diagonally below the second feature, or simply indicating that the first feature is less than the horizontal height of the second feature.

In the description of this embodiment, the terms "up", "down", "right", and other orientation or position relations are based on the orientation or position relations shown in the attached drawings, which can be for the convenience of description and simplified operation, and can or cannot indicate or imply that the device or element referred to must have a specific orientation, be constructed and operated in a specific orientation, so they can or cannot be understood as restrictions on the invention. In addition, the terms "first" and "second" are only used to distinguish between descriptions and have no special meaning.

This embodiment provides an aircraft transport trailer, which can be applied to many types of aircraft, such as large UAV, manned aircraft and electric vertical takeoff and landing aircraft. It can realize the overall transport of the body, and also has the effect of transporting the body and wing together.

Figure 2:
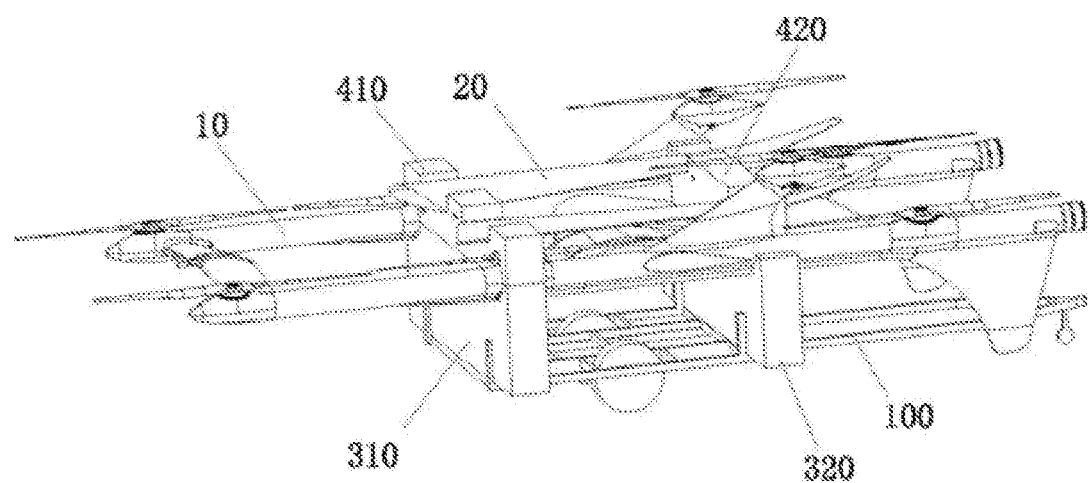
FIG. 2 is a schematic diagram I of the fixed body and wings of the aircraft transport trailer provided by the invention.
Figure 3:
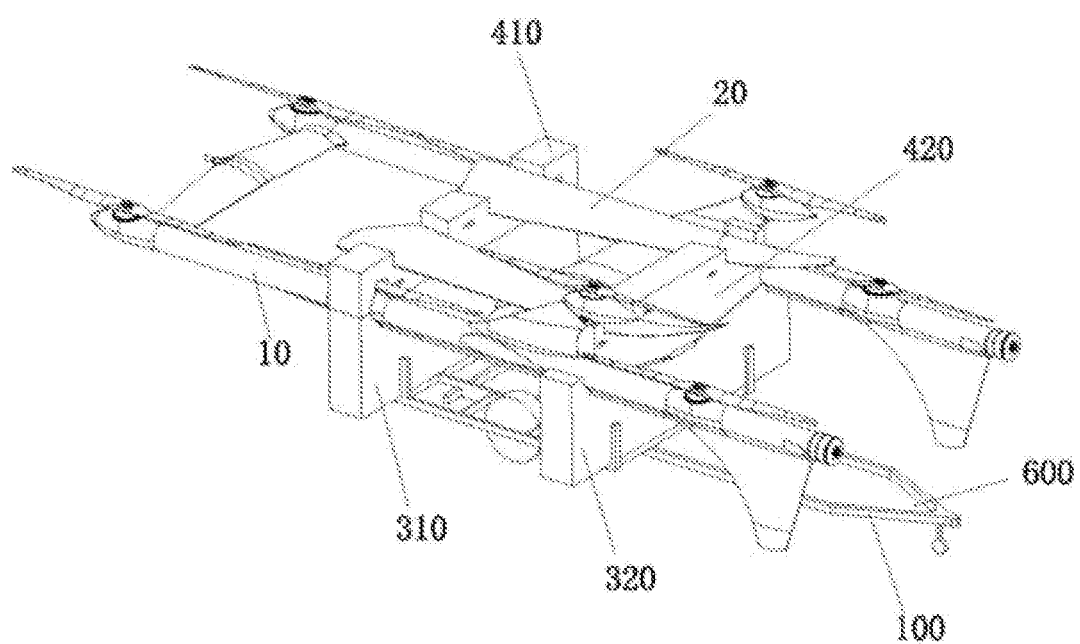
FIG. 3 is a schematic diagram II of the fixed body and wings of the aircraft transport trailer provided by the invention.

Specifically, as shown in FIGS. 1 to 3, the aircraft transport trailer comprises: a frame 100, a wheel assembly, a lower bracket and an upper bracket, the wheel assembly is rotatably mounted on the frame 100 for supporting the frame 100 and moving the frame 100, the lower bracket is fixedly mounted on the frame 100, the lower bracket is provided with a body slot on top, the inner wall of the body slot comprises a preset first surface, the preset first surface is fitted to a part of the lower surface of the body 10 of the aircraft to be transported, so that the body 10 can be partially seated in the body slot, the upper bracket is provided on the lower bracket, the upper bracket is provided with a wing slot on top, the inner wall of the wing slot comprises a preset second surface, the preset second surface is seated with a partially lower surface of the wing 20 of the aircraft to be transported, so that the wing 20 can be partially seated in the wing slot.

The aircraft transports the trailer is provided a body slot on the top of the lower bracket. The preset first surface of the inner wall of the body slot is fitted with the part of the lower surface of the body 10, so that the body 10 can be partially seated in the body slot under the action of gravity, thus achieving the effect of fixing the whole body 10 on the lower bracket. When transporting the aircraft, the body 10 can be fixed and transported without disassembling the body 10. At the same time, the upper bracket is set on the lower bracket, and the wing slot is set on the top of the upper bracket, the preset second surface of the inner wall of the wing slot is fitted with the part of the lower surface of the wing 20, so that the wing 20 can be partially seated in the wing slot under the action of gravity, thus realizing the fixation of the wing 20, and the wing 20 and the body 10 can be fixed on the aircraft transport trailer together, realizing the effect of the body 10 and the wing 20 being transported together. Compared with the prior art, the aircraft transport trailer does not need to disassemble the body 10, which reduces the number of disassembly and assembly of the aircraft in the outfield, and provides a strong guarantee for the quality and safety of the aircraft; In addition, the procedure of separate transportation of the body 10 and the wing 20 is also omitted, which effectively reduces the time and logistics costs of aircraft transportation.

Optionally, as shown in FIG. 1 to FIG. 3, the aircraft transport trailer provided in this embodiment also includes a connection part 600, which is provided on the frame 100 for connection to the trailer hitch of the vehicle. After fixing the body 10 and the wing 20 to the aircraft transport trailer, the frame 100 can be connected to the consigned vehicle through the connection part 600 to achieve the transport of the aircraft.

Further, in the technical solution provided in this embodiment, as shown in FIG. 1 to FIG. 3, the connection part 600 is a hollow area provided on the frame 100, and the trailer hook can hook the edge of the hollow area to achieve the connection between the trailer hook and the frame 100, and the hollow area can also be set to reduce the weight of the frame 100 to a certain extent to facilitate the consignment of the vehicle. It can be understood that in other embodiments, the above-mentioned connection part 600 can also be other structures, such as connecting hook, traction bar, etc.

Optionally, as shown in FIG. 1 to FIG. 3, the wheel assembly includes two main wheels 210 and one auxiliary wheel 220, the two main wheels 210 are coaxially set, and the two main wheels 210 and the auxiliary wheel 220 form a triangular structure, which is simple and has a better support effect.

Optionally, the auxiliary wheel 220 is rotatably mounted on the frame 100 by means of the rod 230, which is rotatably connected to the frame 100, and the rod 230 is set adjacent to the connecting part 600, and when the trailer hook is hooked on the connecting part 600, the rod 230 is rotated relative to the frame 100, thus realizing the folding of the auxiliary wheel 220 and facilitating the connection of the trailer hook to the connecting part 600, as well as the consignment of the vehicle to the aircraft transport trailer.

Optionally, as shown in FIG. 1 to FIG. 3, the upper bracket and the lower bracket are snapped together, and the upper bracket is also provided with an avoidance slot for avoiding the body 10 which is fastened in the body slot. This structure can effectively reduce the overall footprint of the upper and lower brackets, and thus reduce the overall footprint of the vehicle transfer trailer.

Further, the inner wall of the avoidance slot fits against the upper surface of the body 10 that is fastened in the body slot to achieve protection of the upper surface of the body 10 and avoid the upper surface of the body 10 from being bumped.

Optionally, as shown in FIG. 1 to FIG. 3, the lower bracket includes a first lower bracket 310 and a second lower bracket 320, the upper bracket includes a first upper bracket 410 and a second upper bracket 420, the first lower bracket 310 and the second lower bracket 320 are provided at intervals, the first upper bracket 410 is snap-connected to the first lower bracket 310, the second upper bracket 420 is snap-connected to the second lower bracket 320, the body slot including the first body slot 311 and the second body slot 321, the first body slot 311 is set on the first lower bracket 310, the second body slot 321 is set on the second lower bracket 320, the avoidance slot includes the first avoidance slot 411 and the second avoidance slot 421, the first avoidance slot 411 is set on the first upper bracket 410, the second avoidance slot 421 is set on the second upper bracket 420. This achieves the effect of increasing and dispersing the support points of the body 10 in the first direction (the length direction of the frame 100 in FIG. 1 to FIG. 3), improving the uniformity and reliability of the support of the lower bracket on the body 10, and effectively improving the support effect of the lower bracket on the body 10.

Further, as shown in FIG. 1 to FIG. 3, the number of the first body slot 311, the second body slot 321, the first avoidance slot 411 and the second avoidance slot 421 are two, and the two first body slots 311 are distributed on both sides of the first lower bracket 310 and the two second body slots 321 are distributed on both sides of the second lower bracket 320. This increases and disperses the support points of the body 10 in the second direction (the width direction of the frame 100 in FIG. 1 to FIG. 3), further improves the uniformity and reliability of the support of the lower bracket for the body 10, and further improves the support effect of the lower bracket for the body 10.

Optionally, as shown in FIG. 1 to FIG. 3, the first body slot 311 and the second body slot 321 on the same side are provided coaxially, so that the two first body slots 311 and the two second body slots 321 provide a more uniform support force for the body 10.

Further, as shown in FIG. 1 to FIG. 3, the body slot further includes a third body slot 322, and the avoidance slot further includes a third avoidance slot 422, and the third body slot 322 is set in the middle of the first lower bracket 310 and/or the middle of the second lower bracket 320, the third avoidance slot 422 is set opposite to the third body slot 322. The support points of the body 10 are increased and dispersed in the second direction (the width direction of the frame 100 in FIG. 1 to FIG. 3) to improve the uniformity and reliability of the support of the lower bracket for the body 10, and thus improve the support effect of the lower bracket for the body 10. In the technical solution provided in this embodiment, with continued reference to FIG. 1 to FIG. 3, the third body slot 322 is provided on the second lower bracket 320 and the third avoidance slot 422 is provided on the second upper bracket 420, and in practical application, a heavier weight part of the body 10 can be provided on the second lower bracket 320, thereby improving the support force of the heavier weight part of the body 10. Of course, in other embodiments, the third body slot 322 can also be set on the first lower bracket 310, accordingly, the third avoidance slot 422 is set on the first upper bracket 410; or, the third body slot 322 can also be set on the first lower bracket 310 and the second lower bracket 320 at the same time, at this time the third avoidance slot 422 is also set on the first lower bracket 310 and the second lower bracket 320 at the same time according to the actual situation.

Optionally, continue to refer to FIG. 1 to FIG. 3, the wing slots include the first wing slot 412 and the second wing slot 423, the first wing slot 412 is arranged on the first upper bracket 410, and the second wing slot 423 is arranged on the second upper bracket 420. Thus, the effect of adding and dispersing the support points of the wing 20 in the first direction (the length direction of the frame 100 in FIG. 1 to FIG. 3) is achieved, which improves the uniformity and reliability of the support of the upper bracket to the wing 20, and effectively improves the support effect of the upper bracket to the wing 20.

Further, continue to refer to FIG. 1 to FIG. 3, the number of the first wing slot 412 and the second wing slot 423 are both two, and the two first wing slots 412 are distributed on both sides of the first upper bracket 410, accordingly, the two second wing slots 423 are distributed on both sides of the second upper bracket 420. At present, the number of wings of most aircraft is two. Therefore, this structural setting can clamp the two wings 20 in two different positions, and after the wing 20 is clamped and fixed on the upper bracket, the aircraft transport trailer also has good balance.

Optionally, continue to refer to FIG. 1 to FIG. 3, the aircraft transport trailer provided by this embodiment also includes straps (not shown in the figure). The first lower bracket 310 and the second lower bracket 320 are both provided with lower fixing holes (not shown in the figure). The first upper bracket 410 and the second upper bracket 420 are both provided with upper fixing holes 500. The straps pass through the lower fixing holes and upper fixing holes 500, and are used to bind the first lower bracket 310, the first upper bracket 410, the second lower bracket 320, the second upper bracket 420, the body 10 and the wing 20 can be re-fixed, and the first lower bracket 310 and the first upper bracket 410 can be fixed, and the second lower bracket 320 and the second upper bracket 420 can be fixed, so as to improve the reliability of the lower bracket and the upper bracket fixing the body 10 and the wing 20.

Optionally, in the technical solution provided by this embodiment, the first lower bracket 310, the second lower bracket 320, the first upper bracket 410 and the second upper bracket 420 are all made of microcellular foamed materials (i.e. microcellular foamed polypropylene). Compared with ordinary foam materials, the microcellular foamed materials have better supporting and cushioning effects, have good protection effects on the body 10 and the wing 20, and also have good support reliability. It should be noted that the specific composition and preparation method of microcellular foamed polypropylene are current technologies, and will not be described here.

Optionally, in the technical solution provided by this embodiment, the inner walls of the first body slot 311, the second body slot 321, the third body slot 322, the first avoidance slot 411, the second avoidance slot 421, the third avoidance slot 422, the first wing slot 412 and the second wing slot 423 are all equipped with silicone pads to prevent the abrasion of the body 10 and the wing 20 due to bumps during transportation.

The aircraft transport trailer provided by this embodiment is to fix the body 10 on the lower bracket, buckle the upper bracket on the lower bracket, fix the wing 20 on the upper bracket, and then connect the trailer hook of the vehicle with the connecting part 600 to realize the overall transport of the body 10, and the transport of the body 10 and the wing 20 together, which not only reduces the number of off-site disassembly and assembly of the aircraft, but also has low requirements for the checked vehicles, transportation can be realized by using relatively common vehicles, which is suitable for wide promotion and use.

Obviously, the above embodiments of the invention are only to clearly illustrate the examples made by the invention, not to limit the implementation mode of the invention. For ordinary technicians in the art, they can make various obvious changes, readjustments, and replacements without leaving the protection scope of the invention. It is unnecessary and impossible to enumerate all the implementation methods here. Any modification, equivalent replacement and improvement made within the spirit and principle of the utility model shall be included in the scope of protection of the claims of the invention.

The invention claimed is:

1. An aircraft transport trailer, characterized in that, it comprises:
   a frame (100);
   a wheel assembly, the wheel assembly is rotatably mounted on the frame (100);
   a lower bracket, the lower bracket is fixedly mounted on the frame (100), wherein the lower bracket is provided with a body slot on a top of the lower bracket, an inner wall of the body slot comprises a preset first surface, the preset first surface is fitted to a part of a lower surface of an aircraft body (10) to be transported, so that the body (10) can be partially seated in the body slot;
   an upper bracket, the upper bracket is provided on the lower bracket, the upper bracket is provided with a wing slot on a top of the upper bracket, an inner wall of the wing slot comprises a preset second surface, the preset second surface is seated with a partially lower surface of an aircraft wing (20) to be transported, so that the wing (20) can be partially seated in the wing slot.

2. The aircraft transport trailer according to claim 1, characterized in that, the upper bracket is snap-fit connected to the lower bracket, the upper bracket is further provided with an avoidance slot for avoiding the body (10) which is snap-fitted into the body slot.

3. The aircraft transport trailer according to claim 2, characterized in that, the inner wall of the avoidance slot is close to the upper surface of the body (10) which is clamped in the body slot.

4. The aircraft transport trailer according to claim 3 characterized in that, it further comprises a strap, the lower bracket is provided with a lower fixing hole, the upper bracket is provided with an upper fixing hole (500), the strap passes through the lower fixing hole and the upper fixing hole (500) for binding the lower bracket, the upper bracket, the body (10), and the wing (20).

5. The aircraft transport trailer according to claim 2, characterized in that, the lower bracket comprises a first lower bracket (310) and a second lower bracket (320), the upper bracket comprises a first upper bracket (410) and a second upper bracket (420), the first lower bracket (310) is spaced with the second lower bracket (320), the first upper bracket (410) is buckled and connected with the first lower bracket (310), the second upper bracket (420) is buckled and connected with the second lower bracket (320), the body slot includes a first body slot (311) and a second body slot (321), the first body slot (311) is arranged on the first lower bracket (310), the second body slot (321) is arranged on the second lower bracket (320), the avoidance slot includes a first avoidance slot (411) and a second avoidance slot (421), the first avoidance slot (411) is arranged on the first upper bracket (410), and the second avoidance slot (421) is arranged on the second upper bracket (420).

6. The aircraft transport trailer according to claim 5, characterized in that, there are at least two of said first body slot (311), at least two of said second body slot (321), at least two of said first avoidance slot (411) and at least two of said second avoidance slot (421), and wherein the at least two first body slots (311) are distributed on both sides of the first lower bracket (310), and the at least two second body slots (321) are distributed on both sides of the second lower bracket (320).

7. The aircraft transport trailer according to claim 6, characterized in that, the first body slot (311) on a same side is provided coaxially with the second body slot (321).

8. The aircraft transport trailer according to claim 7, characterized in that, the wing slot comprises a first wing slot (412) and a second wing slot (423), the first wing slot (412) is provided on the first upper bracket (410) and the second wing slot (423) is provided on the second upper bracket (420).

9. The aircraft transport trailer according to claim 7, characterized in that, it further includes a connecting part (600), which is arranged on the frame (100) for connecting to the trailer hook of a vehicle.

10. The aircraft transport trailer according to claim 6, characterized in that, the body slot further includes a third body slot (322), and the avoidance slot also includes a third avoidance slot (422), the third body slot (322) is arranged in a middle of the first lower bracket (310) and/or a middle of the second lower bracket (320), the third avoidance slot (422) is opposite to the third body slot (322).

11. The aircraft transport trailer according to claim 10, characterized in that, the wing slot comprises a first wing slot (412) and a second wing slot (423), the first wing slot (412) is provided on the first upper bracket (410) and the second wing slot (423) is provided on the second upper bracket (420).

12. The aircraft transport trailer according to claim 10 characterized in that, it further comprises a strap, the lower bracket is provided with a lower fixing hole, the upper bracket is provided with an upper fixing hole (500), the strap passes through the lower fixing hole and the upper fixing hole (500) for binding the lower bracket, the upper bracket, the body (10), and the wing (20).

13. The aircraft transport trailer according to claim 10, characterized in that, it further includes a connecting part (600), which is arranged on the frame (100) for connecting to the trailer hook of a vehicle.

14. The aircraft transport trailer according to claim 6, characterized in that, the wing slot comprises a first wing slot (412) and a second wing slot (423), the first wing slot (412) is provided on the first upper bracket (410) and the second wing slot (423) is provided on the second upper bracket (420).

15. The aircraft transport trailer according to claim 6 characterized in that, it further comprises a strap, the lower bracket is provided with a lower fixing hole, the upper bracket is provided with an upper fixing hole (500), the strap passes through the lower fixing hole and the upper fixing hole (500) for binding the lower bracket, the upper bracket, the body (10), and the wing (20).

16. The aircraft transport trailer according to claim 5, characterized in that, the wing slot comprises a first wing slot (412) and a second wing slot (423), the first wing slot (412) is provided on the first upper bracket (410) and the second wing slot (423) is provided on the second upper bracket (420).

17. The aircraft transport trailer according to claim 5, characterized in that, it further includes a connecting part (600), which is arranged on the frame (100) for connecting to the trailer hook of a vehicle.

18. The aircraft transport trailer according to claim 2, characterized in that, it further includes a connecting part (600), which is arranged on the frame (100) for connecting to the trailer hook of a vehicle.

19. The aircraft transport trailer according to claim 1 characterized in that, it further comprises a strap, the lower bracket is provided with a lower fixing hole, the upper bracket is provided with an upper fixing hole (500), the strap passes through the lower fixing hole and the upper fixing hole (500) for binding the lower bracket, the upper bracket, the body (10), and the wing (20).

20. The aircraft transport trailer according to claim 1, characterized in that, it further includes a connecting part (600), which is arranged on the frame (100) for connecting to the trailer hook of a vehicle.

* * * * *